US012674067B2

(12) United States Patent
Ozawa

(10) Patent No.: US 12,674,067 B2
(45) Date of Patent: Jul. 7, 2026

(54) INKJET INK AND INKJET RECORDING APPARATUS

(71) Applicant: KYOCERA Document Solutions Inc., Osaka (JP)

(72) Inventor: Noriaki Ozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 181 days.

(21) Appl. No.: 18/352,121

(22) Filed: Jul. 13, 2023

(65) Prior Publication Data

US 2024/0026174 A1 Jan. 25, 2024

(30) Foreign Application Priority Data

Jul. 22, 2022 (JP) ................................. 2022-117048

(51) Int. Cl.

*C09D 11/322* (2014.01)
*B41J 2/21* (2006.01)
*C09D 11/38* (2014.01)

(52) U.S. Cl.

CPC ........... *C09D 11/322* (2013.01); *B41J 2/2146* (2013.01); *C09D 11/38* (2013.01)

(58) Field of Classification Search

CPC ..... C09D 11/322; C09D 11/38; C09D 11/107; C09D 11/326; C09D 11/30; C09D 11/32; B41J 2/2146; B41J 2002/16558; B41J 2/16538; B41J 2/16552; B41J 2002/16591; B41J 2/16585; B41M 5/0023

See application file for complete search history.

(56) References Cited

U.S. PATENT DOCUMENTS

| | | | | |
|---|---|---|---|---|
| 11,247,481 B2 * | 2/2022 | Matsumoto | .......... | C09D 11/322 |
| 2023/0102004 A1 * | 3/2023 | Kikutsuji | ............. | C09D 11/326 522/42 |

FOREIGN PATENT DOCUMENTS

| | | | |
|---|---|---|---|
| JP | 2000-273383 A | | 10/2000 |
| JP | 2013075957 A | * | 4/2013 |

* cited by examiner

*Primary Examiner* — Jannelle M Lebron

(74) *Attorney, Agent, or Firm* — Studebaker Brackett PLLC

(57) ABSTRACT

An inkjet ink contains a quinacridone pigment, a resin, and an aqueous medium. A ratio of a mass of the resin to a mass of the quinacridone pigment is no greater than 0.50. The resin has an acid value of at least 60 mgKOH/g and no greater than 120 mgKOH/g. A supernatant has a phosphorus concentration of no greater than 2.0 ppm. The supernatant is obtained by centrifugation of the inkjet ink at 1,050,000 G for 3 hours.

6 Claims, 4 Drawing Sheets

INKJET INK AND INKJET RECORDING APPARATUS

INCORPORATION BY REFERENCE

The present application claims priority under 35 U.S.C. § 119 to Japanese Patent Application No. 2022-117048, filed on Jul. 22, 2022. The contents of this application are incorporated herein by reference in their entirety.

BACKGROUND

The present disclosure relates to an inkjet ink and an inkjet recording apparatus.

Inkjet recording apparatuses include recording heads that eject an inkjet ink. The inkjet ink is demanded to have ejection stability in ink ejection from the recording heads. To meet such a demand, a liquid for inkjet recording use is proposed that contains a water-based pigment dispersion, for example. The water-based pigment dispersion contains an aqueous liquid, a quinacridone pigment dispersed in the aqueous liquid, a water-soluble quinacridone derivative adsorbed on the surface of the quinacridone pigment, and a non-adsorbed water-soluble quinacridone derivative.

SUMMARY

An inkjet ink according to an aspect of the present disclosure contains a quinacridone pigment, a resin, and an aqueous medium. A ratio of a mass of the resin to a mass of the quinacridone pigment is no greater than 0.50. The resin has an acid value of at least 60 mgKOH/g and no greater than 120 mgKOH/g. A supernatant has a phosphorus concentration of no greater than 2.0 ppm. The supernatant is obtained by centrifugation of the inkjet ink at 1,050,000 G for 3 hours.

An inkjet recording apparatus according to an aspect of the present disclosure includes a conveyance section that conveys a recording medium and a recording head that ejects an ink toward the recording medium. The ink is the afore-mentioned inkjet ink.

DETAILED DESCRIPTION

Figure 1:
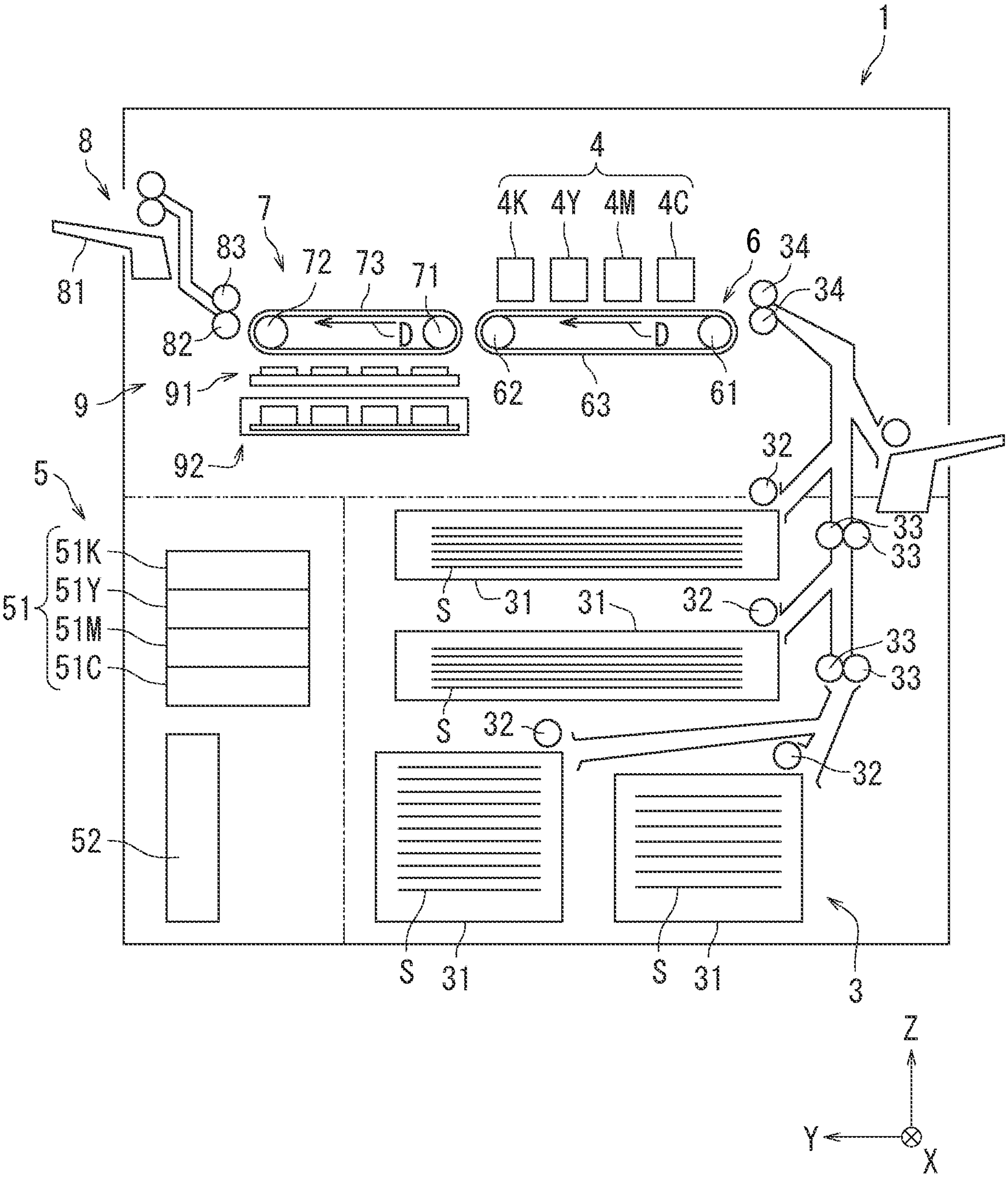
FIG. 1 is a diagram illustrating an example of an inkjet recording apparatus according to a second embodiment of the present disclosure.

The following describes embodiments of the present disclosure. Terms used in the present specification are explained first. Values for volume median diameter ($D_{50}$) are values as measured using a dynamic light scattering type particle size distribution analyzer ("ZETASIZER (registered Japanese trademark) NANO ZS", product of Malvern Instruments Ltd.) unless otherwise stated. Values for acid value are values as measured in accordance with the Japanese Industrial Standards (JIS) K0070:1992 unless otherwise stated. Values for mass average molecular weight (Mw) are values as measured using gel permeation chromatography unless otherwise stated. In the present specification, the term "(meth)acryl" is used as a generic term for both acryl and methacryl. The phrase "each represent, independently of one another," in description about formulas means possibly representing the same group or different groups. For each component indicated in the present specification, one type of the component may be used independently, or two or more types of the component may be used in combination.

First Embodiment: Inkjet Ink

The following describes an inkjet ink (also referred to below simply as ink) according to a first embodiment of the present disclosure.

The ink of the first embodiment contains a quinacridone pigment, a resin, and an aqueous medium. A ratio of a mass of the resin to a mass of the quinacridone pigment is no greater than 0.50. The resin has an acid value of at least 60 mgKOH/g and no greater than 120 mgKOH/g. A supernatant has a phosphorus concentration of no greater than 2.0 ppm. The supernatant is obtained by centrifugation of the inkjet ink at 1,050,000 G for 3 hours.

In the following, the "ratio of a mass of the resin to a mass of quinacridone pigment" may be also referred to below as "resin/pigment ratio". The "phosphorus concentration in the supernatant obtained by centrifugation of the ink at 1,050,000 G for 3 hours" may be also referred to below simply as "specific phosphorous concentration".

As a result of having the above features, the ink of the first embodiment can inhibit occurrence of skewed ink ejection from recording heads. Reasons thereof can be inferred as follows.

For ease of understanding, a quinacridone pigment synthesis method is summarized first. The quinacridone pigment is a compound represented by formula (2), for example. The quinacridone pigment is synthesized through reactions represented by reaction formula (r-1).

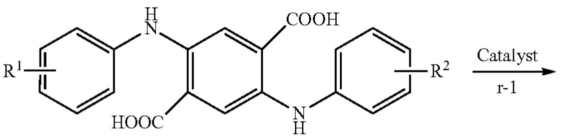

(1)

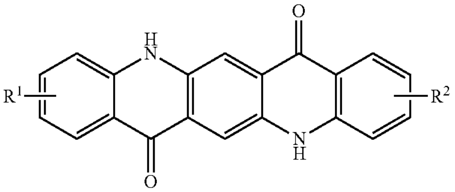

(2)

In formulas (1) and (2), $R^1$, and $R^2$ each represent, independently of one another, a monovalent group. In the following, the "reaction represented by reaction formula (r-1)" may be also referred to below as "reactions (r-1)". Furthermore, "the compounds represented by formulas (1) and (2)" may be also referred to below as "compounds (1) and (2)", respectively. Where $R^1$ and $R^2$ each represent a methyl group, the compound (2) is C.I. Pigment Red 122. Where $R^1$ and $R^2$ each represent a hydrogen atom, the compound (2) is C.I. Pigment Violet 19.

In the reaction (r-1), the compound (2) is obtained by reaction of the compound (1) in presence of a catalyst. The catalyst used in the reaction (r-1) includes a phosphorous-containing catalyst, for example. The quinacridone pigment synthesis method has been explained so far.

The phosphorous-containing catalyst used in the reaction (r-1) may remain in the quinacridone pigment as impurities. Containment of a quinacridone pigment such as above in an ink results in containment of the intermediates in the ink. The phosphorous-containing catalyst has relatively high polarity. Therefore, when images are formed using the ink containing a quinacridone pigment, the phosphorous-containing catalyst may electrostatically attach to the ejection surfaces of recording heads and the inner walls of nozzle orifices. The attached phosphorous-containing catalyst serves as a cause of skewed ink ejection from the recording heads. Therefore, a specific phosphorus concentration in the ink of the first embodiment is set to no greater than 2.0 ppm. The ink with a specific phosphorus concentration of no greater than 2.0 ppm contains a relatively small amount of phosphorous-containing catalyst being an impurity. Thus, inhibition of occurrence of skewed ink ejection from the recording heads can be achieved.

Furthermore, the ink contains a resin in order to disperse the quinacridone pigment in the aqueous medium. The resin may electrostatically attach to the ejection surfaces of the recording heads and the inner walls of the nozzle orifices. The attached resin also serves as a cause of skewed ink ejection from the recording heads likewise the phosphorous-containing catalyst. In view of the forgoing, the resin/pigment ratio is set to no greater than 0.50 in the ink of the first embodiment. As a result of the ink having the resin/pigment ratio of no greater than 0.50, the resin is hardly separate from the ink. As a result, the resin may hardly attach to the ejection surfaces of the recording heads and the inner walls of the nozzle orifices, thereby inhibiting occurrence of skewed ink ejection from the recording heads.

Furthermore, the resin has an acid value of at least 60 mgKOH/g and no greater than 120 mgKOH/g. As a result of the resin having an acid value of at least 60 mgKOH/g, the carboxyl group contained in the resin is moderately increased. As such, the resin can be easily dissolved in the aqueous medium, and separation of the resin from the ink can be inhibited. As a result of the resin having an acid value of no greater than 120 mgKOH/g by contrast, the carboxyl group in the resin does not increase too much. The carboxy group being an anionic group in the resin electrostatically repels the phosphoric acid group being an anionic group contained in the phosphorus-containing catalyst, so that separation of the phosphorus-containing catalyst from the ink can be inhibited. As a result, the phosphorus-containing catalyst and the resin may hardly attach to the ejection surfaces of the recording heads and the inner walls of the nozzle orifices, thereby inhibiting occurrence of skewed ink ejection from the recording heads.

Reasons why the ink of the first embodiment can inhibit skewed ink ejection from the recording heads have been described so far. The ink of the first embodiment is described further in detail below.

<Specific Phosphorous Concentration>

As described previously, the specific phosphorous concentration is no greater than 2.0 ppm. The specific phosphorous concentration is preferably at least 1.0 ppm and no greater than 2.0 ppm. As a result of the specific phosphorous concentration being at least 1.0 ppm and no greater than 2.0 ppm, inhibition of occurrence of skewed ink ejection from the recording heads and improvement of ink storage stability can be achieved.

The specific phosphorous concentration is a concentration of a phosphorous atom that is contained in the supernatant and that is derived from the phosphorous-containing catalyst for synthesis of the quinacridone pigment, for example. That is, the specific phosphorous concentration is a concentration of the phosphorous atom of the phosphorous-containing catalyst contained in the supernatant, for example.

The phosphorous-containing catalyst for synthesis of the quinacridone pigment is at least one selected from the group consisting of polyphosphoric acid and a derivative thereof, for example. As such, the specific phosphorous concentration is a concentration of a phosphorous atom that is contained in the supernatant and that is included in at least one selected from the group consisting of polyphosphoric acid and a derivative thereof. In the following, "at least one selected from the group consisting of polyphosphoric acid and a derivative thereof" may be refer to "polyphosphoric acids".

Examples of the derivative of polyphosphoric acid among the polyphosphoric acids include polyphosphate esters, and more specific examples thereof include polyphosphate alkyl esters. A preferable polyphosphate alkyl ester is polyphosphate methyl ester. The catalyst used in the reaction (r-1) may further include a metal catalyst such as tin in addition to the phosphorous-containing catalyst.

Removal of at least a portion of the phosphorous-containing catalyst remaining in the quinacridone pigment by for example ultrafiltration reduces the specific phosphorous concentration. For example, the specific phosphorous concentration can be adjusted by changing a circulation time of the pigment dispersion in ultrafiltration of the pigment dispersion. The specific phosphorous concentration tends to reduce as the circulation time of the pigment dispersion is increased. The specific phosphorous concentration is measured by the method described in Examples, for example.

<Quinacridone Pigment>

Examples of the quinacridone pigment contained in the ink include C.I. Pigment Violet (19 or 42), C.I. Pigment Red (122, 202, 206, 207, or 209), and C.I. Pigment Orange (48 or 49).

Examples of commercially available products that can be used as the quinacridone pigment include "TRM-11" produced by Dainichiseika Color & Chemicals Mfg. Co., Ltd., "CINQUASIA (registered Japanese trademark) MAGENTA D4550" produced by BASF, "CINQUASIA (registered Japanese trademark) PINK D4450" produced by BASF, "INKJET MAGENTA E-S" produced by Clariant (Japan) K.K., "HOSTAPERM PINK E 02" produced by Clariant (Japan) K.K., "HOSTAPERM RED E3B" produced by Clariant (Japan) K.K., and "HOSTAPERM RED E5B 02" produced by Clariant (Japan) K.K.

The quinacridone pigment has a percentage content in the ink of preferably at least 1% by mass and no greater than 12% by mass, and more preferably at least 4% by mass and no greater than 8% by mass. As a result of the percentage content of the quinacridone pigment being set to at least 1% by mass, images formed with the ink can have favorable image density. As a result of the percentage content of the quinacridone pigment being set to no greater than 12% by mass by contrast, the ink can have favorable fluidity. The ink may contain only the quinacridone pigment as a pigment. Alternatively, the ink may further contain any other pigments as a pigment in addition to the quinacridone pigment in order to adjust hue of the ink.

The quinacridone pigment synthesis method, which has been summarized previously, is described in more detail below.

Examples of the monovalent group represented by $R^1$ and $R^2$ in formulas (1) and (2) include a hydrogen atom, an alkyl group, and a halogen atom. The halogen atom represented by $R^1$ and $R^2$ is preferably a chlorine atom. The alkyl group represented by $R^1$ and $R^2$ is preferably an alkyl group with a carbon number of at least 1 and no greater than 6, and more preferably a methyl group.

In the reaction (r-1), the compound (1) is caused to react in presence of a catalyst to obtain the compound (2). The catalytic reaction (r-1) is a dehydration-ring-closing reaction. For example, in the reaction (r-1), the compound (1) is heated under pressure at a first specific temperature for a specific time in presence of a catalyst (e.g., a phosphorous-containing catalyst, especially polyphosphoric acids). The first specific temperature is at least 85° C. and no greater than 200° C., for example. The specific time is at least 1 hour and no greater than 3 hours, for example. In the reaction (r-1), an organic solvent such as acetone may be used in addition to the compound (1) and the catalyst. Alternatively, an alkali salt obtained by saponifying the compound (1) may be used in the reaction (r-1) in place of the compound (1).

After the reaction (r-1), the compound (2) is subjected to alkali treatment as necessary. Thus, a β-type quinacridone pigment is obtained. The alkali treatment can be performed in a manner that alkali and a wet cake of the compound (2) are heated at a second specific temperature using an autoclave, for example. The second specific temperature is at least 120° C. and no greater than 200° C., for example. The alkali treatment may use an organic solvent in addition. Examples of the organic solvent that can be used in the alkali treatment include N,N-dimethylformamide and glycol.

The quinacridone pigment synthesis method through the reaction (r-1) does not require desorption of a sulfonic acid group or a sulfonate chloride group remaining in a produced quinacridone pigment using sulfuric acid as compared to a synthesis method using an acid having a sulfonic acid group as a ring-closing agent. Therefore, the quinacridone pigment synthesis method through the reaction (r-1) can be implemented easily.

Any of the following treatments may be performed on the quinacridone pigment after the reaction (r-1). Examples of the treatments include a solvent treatment (also referred to below as treatment A) and a post-treatment (also referred to below as treatment B).

(Treatment A)

In the treatment A, the quinacridone pigment is treated with a solvent. An example of the treatment of the quinacridone pigment is kneading the quinacridone pigment and a solvent using a kneader (e.g., a salt mill kneader). In the treatment A, crystal growth and micronization of the quinacridone pigment are prompted. As a result of micronization of the quinacridone pigment being prompted, the quinacridone pigment can have favorable colorability and chroma. The temperature and the time period of the treatment of the quinacridone pigment are not limited particularly and are appropriately set so that the quinacridone pigment has desired particle diameter and particle size distribution. Furthermore, in the treatment A, an inorganic base (specific examples include sodium hydroxide and potassium hydroxide) may be added as necessary as a pulverization aid. The kneaded product of the quinacridone pigment obtained in the treatment A is washed with water or a solvent as needed to be collected as a wet cake.

(Treatment B)

In the treatment B, a post-treatment is performed on the kneaded product of the quinacridone pigment obtained in the treatment A. An example of the post-treatment is separation of the quinacridone pigment by removing the solvent from the kneaded product of the quinacridone pigment. Examples of methods for separating the quinacridone pigment include filtration, drying, and solvent distillation using a rotary evaporator. In solvent distillation, the temperature of solvent distillation is a temperature equal to or higher than the boiling point of the solvent, for example. The separated quinacridone pigment may be pulverized as necessary.

<Resin>

The resin contained in the ink is adsorbed to the quinacridone pigment, for example. The resin is hydrophilic. Therefore, adsorbed resin adsorbed to the surface of the quinacridone pigment disperses the quinacridone pigment in the aqueous medium. The resin as above is also called pigment dispersion resin. The resin constitutes pigment particles together with the quinacridone pigment, for example. The pigment particles each include a core and a coat layer covering the core, for example. The cores of the pigment particles contain the quinacridone pigment. The coat layers of the pigment particles contain the resin. The resin may further include a non-adsorbed resin not adsorbed to the quinacridone pigment, in addition to the adsorbed resin adsorbed to the quinacridone pigment. The non-adsorbed resin is free in the aqueous medium.

As has been described previously, the resin/pigment ratio is no greater than 0.50. In order to inhibit occurrence of skewed ink ejection from recording heads and favorably disperse the pigment particles in the aqueous medium, the resin/pigment ratio is preferably at least 0.35 and no greater than 0.50. The resin/pigment ratio can be calculated using a calculation formula "(resin/pigment ratio)=(mass of resin)/(mass of pigment)".

As has been described previously, the resin has an acid value of at least 60 mgKOH/g and no greater than 120 mgKOH/g. To further inhibit occurrence of skewed ink ejection from the recording heads, the resin preferably has an acid value of at least 80 mgKOH/g and no greater than 100 mgKOH/g.

Examples of the resin include (meth)acrylic resin, styrene-(meth)acrylic resin, styrene-maleic acid resin, and urethane resin. In terms of stably dispersing the quinacridone pigment, the resin is preferably styrene-(meth)acrylic resin.

Styrene-(meth)acrylic resin includes, each as a repeating unit, at least one repeating unit derived from styrene or a derivative thereof and at least one repeating unit derived from (meth)acrylic acid. Preferably, the styrene-(meth)acrylic resin further includes at least one repeating unit derived from (meth)acrylic acid ester as a repeating unit.

Examples of a first monomer that can form the repeating unit derived from styrene or a derivative thereof include styrene, α-methylstyrene, and vinyltoluene. The first monomer is preferably styrene. Preferably, the repeating unit derived from styrene or a derivative thereof has a percentage content to all repeating units included in the resin of at least 25.0% by mass and no greater than 60.0% by mass.

Examples of a second monomer that can form the repeating unit derived from (meth)acrylic acid include acrylic acid and methacrylic acid. The second monomer is preferably methacrylic acid. The repeating unit derived from (meth)acrylic acid has a percentage content to all the repeating units included in the resin of preferably at least 4.5% by mass and no greater than 10.0% by mass. When the resin includes both of a repeating unit derived from acrylic acid and a repeating unit derived from methacrylic acid, the percentage content of the repeating unit derived from (meth) acrylic acid is the total percentage content of the repeating unit derived from acrylic acid and the repeating unit derived from methacrylic acid.

Examples of a third monomer that can form the repeating unit derived from (meth)acrylic acid ester include (meth) acrylic acid alkyl ester. The (meth)acrylic acid alkyl ester is preferably (meth)acrylic acid alkyl ester having an alkyl group with a carbon number of at least 1 and no greater than 8, more preferably (meth)acrylic acid alkyl ester having an alkyl group with a carbon number of at least 1 and no greater than 4, further preferably methyl (meth)acrylate or butyl (meth)acrylate, and particularly preferably methyl methacrylate or butyl acrylate. The percentage content of the repeating unit derived from (meth)acrylic acid ester to all the repeating units included in the resin is preferably at least 35.0% by mass and no greater than 70.0% by mass, and more preferably at least 40.0% by mass and no greater than 70.0% by mass. When the resin includes two or more repeating units derived from (meth)acrylic acid ester, the percentage content of the repeating unit derived from (meth) acrylic acid ester is the total percentage content of the two or more repeating units derived from (meth)acrylic acid ester.

Preferably, the resin includes at least one repeating unit derived from (meth)acrylic acid, at least one repeating unit derived from alkyl (meth)acrylate, and a repeating unit derived from styrene. More preferably, the resin includes one repeating unit derived from (meth)acrylic acid, one or two repeating units derived from alkyl (meth)acrylate, and a repeating unit derived from styrene. Particularly preferably, the resin includes a repeating unit derived from methacrylic acid, a repeating unit derived from methyl methacrylate, a repeating unit derived from butyl acrylate, and a repeating unit derived from styrene. The percentage content of the at least one (meth)acrylic acid (preferably, the percentage content of one repeating unit derived from (meth)acrylic acid, and more preferably the percentage content of a repeating unit derived from methacrylic acid) is preferably at least 4.5% by mass and no greater than 10.0% by mass to all the repeating units included in the resin.

The resin has a mass average molecular weight of preferably at least 10,000 and no greater than 50,000, and more preferably at least 15,000 and no greater than 30,000. As a result of the mass average molecular weight of the resin being set to at least 10,000 and no greater than 50,000, the ink has favorable viscosity.

The resin has a percentage content in the ink of preferably at least 0.5% by mass and no greater than 8.0% by mass, and more preferably at least 1.5% by mass and no greater than 4.0% by mass. As a result of the percentage content of the resin being set to at least 0.5% by mass, agglomeration of the quinacridone pigment can be favorably inhibited. As a result of the percentage content of the resin being set to no greater than 8.0% by mass, clogging of the nozzles of the recording heads can be favorably inhibited.

<Aqueous Medium>

The aqueous medium contained in the ink is a medium containing water. The aqueous medium may function as a solvent or function as a dispersion medium. Examples of the aqueous medium include water and aqueous mediums containing a water-soluble organic solvent.

Examples of the water-soluble organic solvent include glycol compounds, triol compounds, glycol ether compounds, lactam compounds, nitrogen-containing compounds, acetate compounds, γ-butyrolactone, thiodiglycol, and dimethyl sulfoxide.

Examples of the glycol compounds include ethylene glycol, 1,3-propanediol, propylene glycol, 1,3-butanediol, 1,2-pentanediol, 1,5-pentanediol, 1,2-hexanediol, 1,2-octanediol, 1,8-octanediol, 3-methyl-1,3-butanediol, 3-methyl-1,2-pentanediol, 3-methyl-1,5-pentanediol, 2,4-diethyl-1,5-pentanediol, 2-butyl-2-ethyl-1,3-propanediol, diethylene glycol, dipropylene glycol, trimethylene glycol, triethylene glycol, tripropylene glycol, tetraethylene glycol, 2-ethyl-1,2-hexanediol, and thiodiglycol. A preferable glycol compound is 1,5-pentanediol.

Examples of the triol compounds include glycerin, 1,2,3-butanetriol, and 1,2,6-hexanetriol. A preferable triol compound is glycerin.

Examples of the glycol ether compounds include diethylene glycol diethyl ether, diethylene glycol monoethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether. A preferable glycol ether compound is triethylene glycol monobutyl ether.

Examples of the lactam compounds include 2-pyrrolidone and N-methyl-2-pyrrolidone. Preferably, the lactam compound is 2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

Preferably, the aqueous medium is any of the mixed solvents in which the following combinations (i) or (ii) are mixed.

Combination (i): water, triethylene glycol monobutyl ether, and glycerin

Combination (ii): water, 1,5-pentanediol, and glycerin

The aqueous medium has a percentage content in the ink of preferably at least 30% by mass and no greater than 95% by mass, and more preferably at least 70% by mass and no greater than 95% by mass.

<Surfactant>

Preferably, the ink further contains a surfactant. The surfactant optimizes compatibility and dispersion stability of each component contained in the ink. Furthermore, the surfactant optimizes permeability of the ink to a recording medium. The surfactant is preferably a nonionic surfactant.

Examples of the nonionic surfactant include acetylenediols and ethylene oxide adducts of acetylenediols. Examples of the acetylenediols include 2,4,7,9-tetramethyl-5-decyn-4,7-diol, 3,6-dimethyl-4-octine-3,6-diol, 3,5-dimethyl-1-hexyne-3-ol, and 2,4-dimethyl-5-hexyne-3-ol. A preferably nonionic surfactant is an ethylene oxide adduct of acetylenediol or an ethylene oxide adduct of acetylene glycol. The nonionic surfactant has an HLB value of preferably at least 4 and no greater than 14, and more preferably at least 4 and no greater than 8 or at least 10 and no greater than 14. When the ink contains a surfactant, the surfactant preferably has a percentage content in the ink of at least 0.01% by mass and no greater than 1.0% by mass.

<Other Components>

The ink may further contain any known additive (specific examples include a solution stabilizer, an anti-drying agent, an antioxidant, a viscosity modifier, a pH adjuster, a neutralizer, and an antifungal agent) as necessary.

<Ink Production Method>

A method for producing the ink of the first embodiment includes a pigment dispersion preparation process, an ultrafiltration process, and a mixing process, for example.

(Pigment Dispersion Preparation Process)

In the pigment dispersion preparation process, the quinacridone pigment, the resin, and the aqueous medium are mixed to yield a pigment dispersion. In order to sufficiently disperse the pigment particles, the pigment dispersion may further contain a surfactant. In the pigment dispersion, pigment particles constituted by the quinacridone pigment and the resin preferably have a volume median diameter ($D_{50}$) of at least 50 nm and no greater than 140 nm.

The quinacridone pigment has a percentage content in the pigment dispersion of preferably at least 5% by mass and no greater than 25% by mass, and more preferably at least 10% by mass and no greater than 20% by mass. The resin has a percentage content in the pigment dispersion of preferably at least 2% by mass and no greater than 10% by mass, and more preferably at least 4% by mass and no greater than 8% by mass. When the pigment dispersion contains a surfactant, the surfactant has a percentage content in the pigment dispersion of preferably at least 0.1% by mass and no greater than 2% by mass, and more preferably at least 0.3% by mass and no greater than 1% by mass.

The pigment dispersion can be prepared by wet dispersion of the components contained in the afore-mentioned pigment dispersion using a media type wet disperser. Examples of the media type wet disperser include bead mills (specific examples include “NANO GRAIN MILL” produced by Asada Iron Works Co., Ltd., “MSC MILL” produced by Nippon Coke & Engineering Co., Ltd., and “DYNO (registered Japanese trademark) MILL produced by Willy A. Bachofen AG).

Wet dispersion using a media type wet disperser uses small-diameter beads (e.g., beads with a diameter of at least 0.5 mm and no greater than 1.0 mm) as a medium, for example. Changing the diameter of the beads can change the degree of dispersion of the pigment and the non-adsorbed resin rate. The smaller the diameter of the beads is, the smaller the $D_{50}$ of the pigment particles tends to be. As the diameter of the beads is decreased, the cores containing the quinacridone pigment are easily coated with the resin and the non-adsorbed resin rate tends to be low. The material of the beads is not particularly limited and is preferably a hard material (e.g., glass or zirconia). The discharge amount of the media type wet disperser is at least 200 g/min and no greater than 600 g/min, for example. As the discharge amount of the media type wet disperser is increased, the non-adsorbed resin rate tends to increase.

(Ultrafiltration Process)

In the ultrafiltration process, the pigment dispersion is ultrafiltrated. Ultrafiltration removes at least a portion of the phosphorous-containing catalyst to reduce the phosphorous concentration of the pigment dispersion. As a result of the ink containing a pigment dispersion such as above, the specific phosphorous concentration of the ink can be easily adjusted to a value within the desired range. In order to remove at least a portion of the phosphorous-containing catalyst, an ultrafiltration membrane used for ultrafiltration preferably has a molecular weight cutoff selected from among molecular weight cutoffs that allow filtration of at least a portion of the phosphorous-containing catalyst and that disallow filtration of components of the pigment dispersion other than the phosphorous-containing catalyst. Furthermore, the molecular weight cutoff of the ultrafiltration membrane used for ultrafiltration is preferably larger than the molecular weight of the phosphorous-containing catalyst and no greater than the molecular weight of the resin. In order to adjust the specific phosphorous concentration to a value within the desired range, the circulation time in ultrafiltration is preferably at least 0.4 hours. In order to reduce manufacturing cost, the circulation time of the ink in ultrafiltration is preferably no greater than 2.0 hours. Through ultrafiltration, a liquid containing the phosphorous-containing catalyst is separated as a filtrate, and a liquid containing the components of the pigment dispersion other than the phosphorous-containing catalyst is recirculated as a recovery liquid. The solid concentration of the pigment dispersion can be kept constant by adding water in an amount equal to the amount of the separated filtrate to the recovery liquid.

(Mixing Process)

In the mixing process, the pigment dispersion after the ultrafiltration process and any components (e.g., further added aqueous medium and surfactant) added as necessary are mixed using a stirrer. Mixing of each component of the ink may be followed by removal of foreign matter and coarse particles using a filter (e.g., a filter with a pore diameter of no greater than 5 μm).

The pigment dispersion has a percentage content in all raw materials of the ink of at least 25% by mass and no greater than 60% by mass, for example. Note that the ink of the first embodiment can be favorably used in a later-described inkjet recording apparatus, for example.

Second Embodiment: Inkjet Ink Recording Apparatus

The following describes an inkjet recording apparatus according to a second embodiment of the present disclosure. The inkjet recording apparatus of the second embodiment includes a recording head and a conveyance section that conveys a recording medium. The recording head ejects the ink of the first embodiment toward the recording medium. Details of the inkjet recording apparatus of the second embodiment is described next with reference to the accompanying drawings. Note that the drawings to be referenced schematically illustrate elements of configuration in order to facilitate understanding, and therefore, properties such as the size and the number of each element of configuration illustrated in the drawings may differ from actual properties.

FIG. 1 is a diagram illustrating a configuration of an inkjet recording apparatus 1 according to the second embodiment. The X axis, the Y axis, and the Z axis illustrated in FIG. 1 and FIGS. 2 to 4 described later are perpendicular to each other.

The inkjet recording apparatus 1 illustrated in FIG. 1 includes a sheet feed section 3, a first recording head 4C, a second recording head 4M, a third recording head 4Y, a fourth recording head 4K, a liquid accommodation section 5, a first conveyance section 6, a second conveyance section 7, an ejection section 8, and a maintenance section 9. In the following, the first to fourth recording heads 4C to 4K may be also referred to below simply as recording heads 4 where there is no need to distinguish them.

The sheet feed section 3 includes a plurality of sheet feed cassettes 31, a plurality of pickup rollers 32, a plurality of conveyance rollers 33, and a registration roller pair 34. Sheets S of a recording medium are stacked and accommodated in each of the sheet feed cassettes 31. The pickup rollers 32 pickup sheets S of the recording medium accommodated in the sheet feed cassettes 31 one at a time. The conveyance rollers 33 convey the sheet S picked out by a corresponding one of the pickup rollers 32. The registration roller pair 34 temporarily holds the sheet S of the recording medium conveyed by the conveyance rollers 33, and then supplies the sheet S to the first conveyance section 6 at a predetermined timing.

The recording heads 4 are disposed above a first conveyor belt 63. The first recording head 4C to the fourth recording head 4K are disposed in the stated order in terms of a conveyance direction D of the sheet S of the recording medium. The first recording head 4C to the fourth recording head 4K are located at the same height. Respective inks with four mutually different colors (e.g., cyan, magenta, yellow and black) are loaded in the first recording head 4C to the fourth recording head 4K. The ink loaded in the second recording head 4M is the ink of the first embodiment with magenta color. The recording heads 4 eject the inks toward the sheet S of the recording medium. Of the recording heads 4, the second recording head 4M ejects an ink with magenta color, which is the ink of the first embodiment, toward the sheet S of the recording medium. As a result, an image (e.g., a color image) is formed on the sheet S of the recording medium conveyed by the first conveyor belt 63.

Use of the ink of the first embodiment in the inkjet recording apparatus 1 of the second embodiment can inhibit skewed ejection of the ink from the second recording head 4M for the same reasons as described in the first embodiment.

The liquid accommodation section 5 includes a first ink tank 51C, a second ink tank 51M, a third ink tank 51Y, a fourth ink tank 51K, and a cleaning liquid tank 52. In the following, the first ink tank 51C to the fourth ink tank 51K may be also referred to below simply as ink tanks 51 where there is no need to distinguish them. The first ink tank 51C to the fourth ink tank 51K store the respective inks with four mutually different colors (e.g., cyan, magenta, yellow, and black). The ink stored in the second ink tank 51M is the ink of the first embodiment with magenta color. The first ink tank 51C to the fourth ink tank 51K supply the inks to the first recording head 4C to the fourth recording head 4K, respectively. The cleaning liquid tank 52 supplies a cleaning liquid to a liquid impregnating body 91.

The first conveyance section 6 is disposed downstream of the sheet feed section 3 in terms of the conveyance direction D of the sheet S of the recording medium. The first conveyance section 6 includes a first driven roller 61, a first drive roller 62, and a first conveyor belt 63. The first drive roller 62 is disposed downstream of the first driven roller 61 in terms of the conveyance direction D of the sheet S of the recording medium. The first conveyor belt 63 is an endless belt wound between the first driven roller 61 and the first drive roller 62. The first drive roller 62 is rotationally driven in the anticlockwise direction in FIG. 1. This causes the first drive roller 62 to circulate the first conveyor belt 63. Circulation of the first conveyor belt 63 conveys to the second conveyance section 7 the sheet S of the recording medium fed from the sheet feed section 3 in the conveyance direction D. The first driven roller 61 follows the rotation of the first drive roller 62 to rotate through the first conveyor belt 63.

The second conveyance section 7 is disposed downstream of the first conveyance section 6 in terms of the conveyance direction D of the sheet S of the recording medium. The second conveyance section 7 includes a second driven roller 71, a second drive roller 72, and a second conveyor belt 73. The second drive roller 72 is disposed downstream of the second driven roller 71 in terms of the conveyance direction D of the sheet S of the recording medium. The second conveyor belt 73 is an endless belt wound between the second driven roller 71 and the second drive roller 72. The second drive roller 72 is rotationally driven in the anticlockwise direction in FIG. 2. This causes the second drive roller 72 to circulate the second conveyor belt 73. Circulation of the second conveyor belt 73 conveys to the ejection section 8 the sheet S of the recording medium conveyed from the first conveyance section 6 in the conveyance direction D. The second driven roller 71 follows the rotation of the second drive roller 72 to rotate through the second conveyor belt 73.

The ejection section 8 is disposed downstream of the second conveyance section 7 in terms of the conveyance direction D of the sheet S of the recording medium. The ejection section 8 includes an exit tray 81, an ejection drive roller 82, and an ejection driven roller 83. The ejection drive roller 82 and the ejection driven roller 83 are in pressure contact with each other at a location opposite to each other. The ejection drive roller 82 is rotationally driven in the anticlockwise direction in FIG. 2. The ejection driven roller 83 follows the rotation of the ejection drive roller 82 to rotate. In the above configuration, the ejection drive roller 82 and the ejection driven roller 83 eject the sheet S of the recording medium conveyed from the second conveyance section 7 onto the exit tray 81. The ejected sheet S of the recoding medium is placed on the exit tray 81.

The maintenance section 9 includes a liquid impregnating body 91 and a cleaning member 92. The liquid impregnating body 91 is impregnated with the cleaning liquid. The liquid impregnating body 91 comes into contact with ejection surfaces 42 (see FIG. 2) of the recording heads 4 to supply the cleaning liquid to the ejection surfaces 42. The liquid impregnating body 91 is sponge, non-woven fabric, or an absorbent sheet. The cleaning member 92 wipes the ejection surfaces 42 of the recording heads 4. Wiping by the cleaning member 92 cleans ink attached to the ejection surfaces 42. The cleaning member 92 is a rubber wiper, for example.

Figure 2:
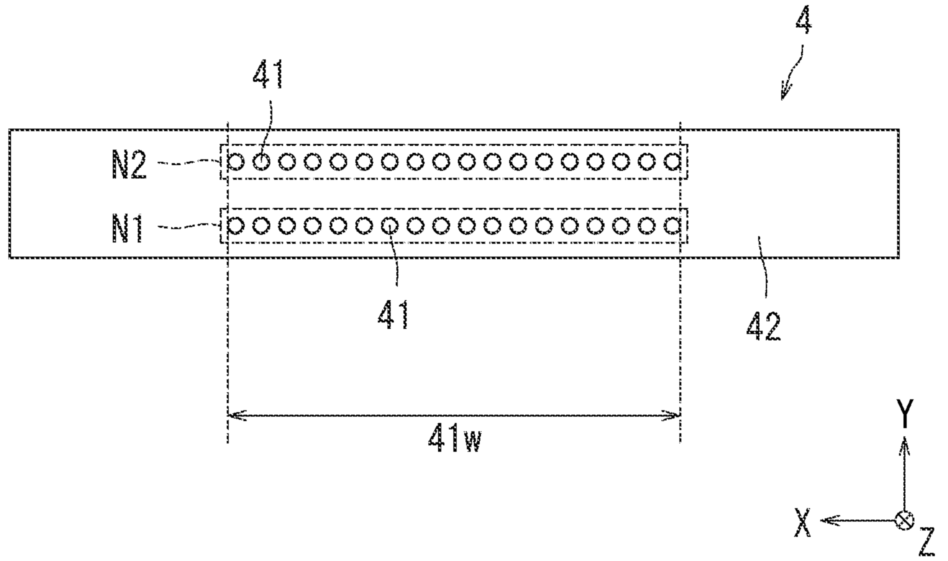
FIG. 2 is a diagram illustrating the lower surface of a recording head illustrated in FIG. 1.

Next, the recording heads 4 are further described with reference to FIG. 2. FIG. 2 is a diagram illustrating the lower surface of a recording head 4 illustrated in FIG. 1.

As illustrated in FIG. 2, the recording head 4 has a first nozzle row N1, a second nozzle row N2, and an ejection surface 42. In order to facilitate understanding, the first nozzle row N1 and the second nozzle raw N2 are each encircled by a broken line in FIG. 2. The first nozzle row N1 and the second nozzle row N2 each include a plurality of nozzles 41. The nozzles 41 eject an ink toward the sheet S of the recording medium. The nozzles 41 open at the ejection surface 42. The first nozzle row N1 and the second nozzle row N2 are arranged side by side in terms of the conveyance direction D of the sheet S of the recording medium. The nozzles 41 are spaced from each other in a direction perpendicular to the conveyance direction D of the sheet S of the recording medium in each of the first nozzle row N1 and the second nozzle row N2. The recording head 4 is a line head, for example.

The first nozzle row N1 and the second nozzle row N2 each have a width 41*w* (i.e., a width of an area on which the recording head 4 is capable of performing recording) that is equal to or larger than the width of the sheet S of the recording medium. As such, the recording head 4 can perform image formation on the sheet S of the recording medium conveyed on the first conveyor belt 63 in a fixed state. That is, the inkjet recording apparatus 1 adopts a single path scheme that is a scheme without performing shuttle movement. As a result of including the above-described recording heads 4, the inkjet recording apparatus 1 of the second embodiment can perform printing at higher speed than an inkjet recording apparatus including a serial head.

Figure 3:
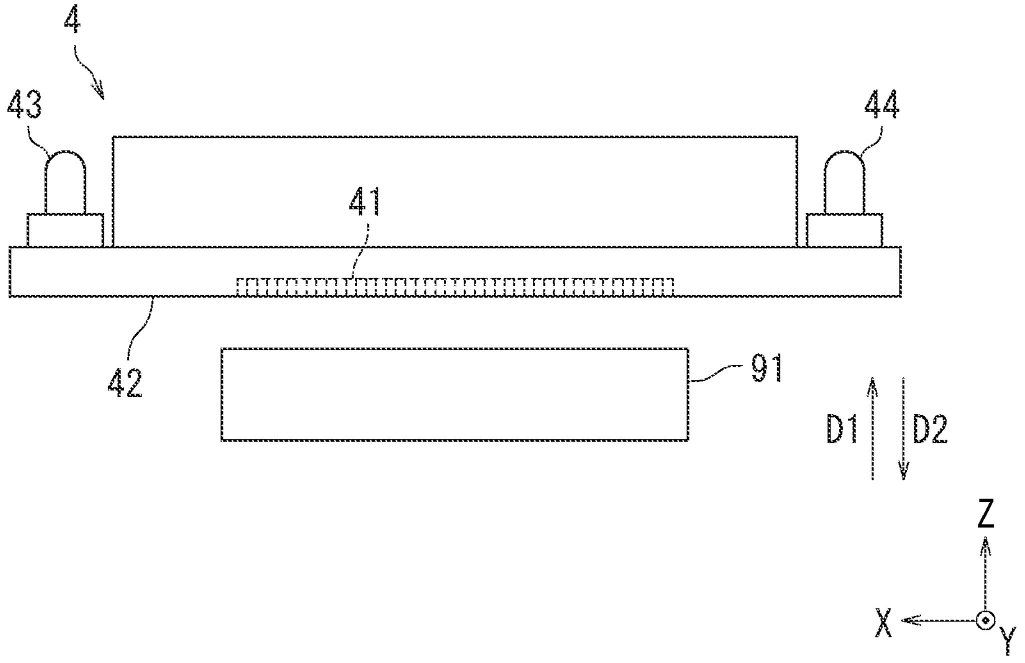
FIG. 3 is a diagram explaining a cleaning liquid supply operation.
Figure 4:
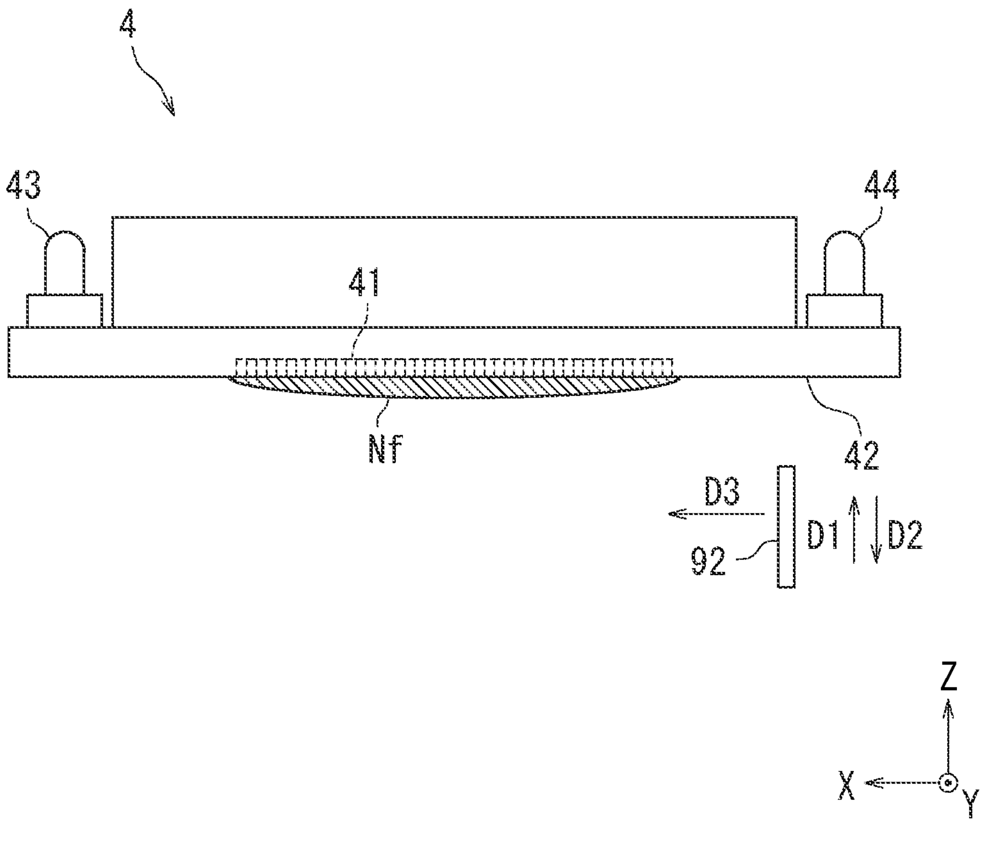
FIG. 4 is a diagram explaining a purging operation and a wiping operation.

With reference to FIGS. 3 and 4, a cleaning operation by the maintenance section 9 is described next. The cleaning operation includes a cleaning liquid supply operation, a purging operation, and a wiping operation. FIG. 3 is a diagram explaining the cleaning liquid supply operation. FIG. 4 is a diagram explaining the purging operation and the wiping operation. Note that although the nozzles 41 are not viewed in a side view of a recording head 4, the position of the nozzles 41 is indicated by broken lines in FIGS. 3 and 4 for easy understanding.

As illustrated in FIG. 3, the recording head 4 further includes an ink inlet 43 and an ink outlet 44. The ink flows into the recording head 4 through the ink inlet 43 from the ink tank 51 and flows out of the recording head 4 through the ink outlet 44.

As illustrated in FIG. 1, the liquid impregnating body 91 of the maintenance section 9 is disposed below the second conveyor belt 73. The cleaning member 92 of the maintenance section 9 is disposed below the liquid impregnating body 91. The liquid impregnating body 91 and the cleaning member 92 are moveable between a location opposite to the second conveyance section 7 and a location opposite to the ejection surfaces of the recording heads 4. Furthermore, the liquid impregnating body 91 is movable both in an ascending direction D1 and a descending direction D2 as illustrated in FIG. 3. The cleaning member 92 is movable in the ascending direction D1, the descending direction D2, and a wiping direction D3 as illustrated in FIG. 4. The "ascending direction D1" is a direction approaching the ejection surfaces 42 in the Z-axis direction. The "descending direction D2" is a direction away from the ejection surfaces 42 in the Z-axis direction. The "wiping direction D3" is a direction along the ejection surfaces 42. The liquid impregnating body 91 and the cleaning member 92 are moved by known drive mechanisms (not illustrated).

Here, ink attached to the ejection surfaces 42 may dry and adhere to the ejection surfaces 42. In order to clean the adhered ink, the cleaning operation is performed.

First, the cleaning liquid supply operation of the cleaning operation is described. The liquid impregnating body 91 is impregnated with the cleaning liquid. Next, the liquid impregnating body 91 moves to a location opposite to the ejection surfaces 42, and then moves in the ascending direction D1 as illustrated in FIG. 3. Thereafter, the liquid impregnating body 91 is pushed against the ejection surfaces 42. In the manner described above, the cleaning liquid impregnated in the liquid impregnating body 91 is attached to the ejection surfaces 42. The state in which the liquid impregnating body 91 is pushed against the ejection surfaces 42 is preferably kept for a specific time. The specific time is preferably at least 1 second and no greater than 5 minutes. Once the specific time elapses, the liquid impregnating body 91 moves in the descending direction D2. As a result, the state in which the liquid impregnating body 91 is pushed against the ejection surfaces 42 is released.

Next, the purging operation is described. As illustrated in FIG. 4, the ink is purged from each recording head 4. In FIG. 4, the ink (purging ink) purged is indicated with a reference sign "Nf" attached thereto. Specifically, the ink is forcedly discharged from the nozzles 41 by pressure application in the recording head 4. This removes clogging and the like of the nozzles 41 and causes the purging ink Nf to attach to the ejection surfaces 42 of the recording heads 4.

Next, the wiping operation is described. The cleaning member 92 having moved to a location (location illustrated in FIG. 4) opposite to the ejection surfaces 42 moves in the ascending direction D1. Thereafter, the cleaning member 92 is pushed against the ejection surfaces 42. The cleaning member 92 moves in a direction (wiping direction D3 in FIG. 4) along the ejection surfaces 42 with it being pushed against the ejection surfaces 42. This allows the cleaning member 92 to wipe the ejection surfaces 42. As a result, ink (e.g., dried ink and the purging ink Nf) attached to the ejection surfaces 42 is removed together with the cleaning liquid. Thus, the ejection surfaces 42 of the recording heads 4 are cleaned. Next, the cleaning member 92 moves in the descending direction D2. As a result, the state in which the cleaning member 92 is pushed against the ejection surfaces 42 is released.

The inkjet recording apparatus 1 being an example of the inkjet recording apparatus of the second embodiment has been described so far. However, the inkjet recording apparatus of the second embodiment is not limited to the inkjet recording apparatus 1. The inkjet recording apparatus of the second embodiment may adopt a multipath method. Furthermore, the number of the nozzles 41, the intervals between the nozzles 41, and the positional relationship among the nozzles 41 in the first recording head 4C to the fourth recording head 4K may be set as appropriate according to the specification of the apparatus. The cleaning liquid supply operation may be any of cleaning liquid ejection by inkjetting, cleaning liquid application using a roller, and cleaning liquid spraying. Furthermore, the cleaning liquid supply operation, the purging operation, the wiping operation may each be repeated. The order of the cleaning liquid supply operation and the purging operation is not limited. The cleaning member 92 may move back and forth in a direction along the ejection surfaces 42. For example, it is possible that the cleaning member 92 being pushed against the ejection surfaces 42 moves in a first direction (the wiping direction D3 in FIG. 4) along the ejection surfaces 42, and then moves in a second direction (direction opposite to the wiping direction D3 in FIG. 4) opposite to the first direction along the ejection surfaces 42.

EXAMPLES

The following describes examples of the present disclosure. However, the present disclosure is not limited to the following examples. Note that ion exchange water may be referred to simply as water in the following examples.

[Study 1: Specific Phosphorous Concentration]

The specific phosphorous concentration was studied. Inks (A-1) to (A-7) used for the study were prepared according to the following methods.

<Preparation of Resin (R-1)>

First, a resin (R-1) is prepared for preparing inks (A-1) to (A-7). The resin (R-1) included a repeating unit (MAA unit) derived from methacrylic acid, a repeating unit (MMA unit) derived from methyl methacrylate, a repeating unit (BA unit) derived from butyl acrylate, and a repeating unit (ST) derived from styrene. The resin (R-1) had a mass average molecular weight (Mw) of 20,000 and an acid value of 100 mgKOH/g. To the mass of all repeating units in the resin, the percentage content of the MAA unit was 8.1% by mass, the percentage content of the MMA unit was 36.9% by mass, the percentage content of the BA unit was 30.0% by mass, and the percentage content of the ST unit was 25.0% by mass.

(Measurement of Resin Acid Value)

The acid values of the resin (R-1) and resins (R-2) to (R-6) described later were measured in accordance with the Japanese Industrial Standards (JIS) K0070:1992.

(Measurement of Resin Mass Average Molecular Weight)

The mass average molecular weights of the resin (R-1) and the later-described resins (R-2) to (R-6) were measured under the following measurement conditions using a gel permeation chromatography ("HLC-8020GPC", product of Tosoh Corporation). A calibration curve was potted using n-propylbenzene and seven selected TSKgel Standard Polystyrenes. The TSKgel Standard Polystyrenes were F-40, F-20, F-4, F-1, A-5000, A-2500, and A-1000 each produced by Tosoh Corporation.

The conditions for mass average molecular weight measurement were as follows.

Column: "TSKgel Super Multipore HZ-H" produced by Tosoh Corporation (semi-microcolumn with 4.6 mm ID×15 cm)

Number of columns: 3

Eluent: tetrahydrofuran

Flow rate: 0.35 mL/min

Sample injection amount: 10 μL

Measurement temperature: 40° C.

Detector: refractive index (RI) detector

<Preparation of Ink (A-1)>

(Pigment Dispersion Preparation)

A pigment dispersion was prepared to achieve a mixing ratio d-a shown in Table 1.

TABLE 1

| Pigment dispersion | Mixing ratio d-a [part by mass] |
|---|---|
| Water | Rest |
| Resin (R-1) | 6.0 |
| Sodium hydroxide | Specific amount |
| Pigment PR-122 | 15.0 |
| Olfine E1010 | 0.5 |
| Total | 100.0 |

The terms used in Table 1 and Tables 5, 7, and 10 described later are as follows. "Pigment PR-122" means a quinacridone pigment (C.I. Pigment Red 122). "Olfine E1010" means a nonionic surfactant ("OLFINE (registered Japanese trademark) E1010", product of Nissin Chemical Industry Co., Ltd., contents: ethylene oxide adduct of acetylenediol, active component concentration: 100% by mass, HLB value: 13.5±0.5).

First, 6.0 parts by mass of the resin (R-1) and a sodium hydroxide aqueous solution were mixed. The sodium hydroxide aqueous solution contained a specific amount of sodium hydroxide. The "specific amount" being an amount of sodium hydroxide added in Table 1 indicates 1.05 times the amount necessary for equivalent neutralization of the resin (R-1). As such, the resin (R-1) was neutralized with an equivalent amount (strictly, 105% equivalent amount) of sodium hydroxide to obtain an aqueous solution I containing the resin (R-1).

A vessel was charged with the full amount of the resultant aqueous solution I, 15.0 parts by mass of the quinacridone pigment (C.I. Pigment Red 122), 0.5 parts by mass of the nonionic surfactant ("OLFINE (registered Japanese trademark) E1010", product of Nissin Chemical Industry Co., Ltd.), and the remaining amount of water. The vessel contents were mixed using a media type wet disperser ("DYNO (registered Japanese trademark)-MILL", product of Willy A. Bachofen AG (WAB)) to obtain a mixed liquid II.

Note that "Rest" being an amount of water added in Table 1 means the amount by which the mixed liquid II becomes 100.0 parts by mass. The remaining amount of water in Table 1 is a total amount of water added to the vessel and water contained in the aqueous solution I (in detail, water contained in the sodium hydroxide aqueous solution used for resin neutralization and water produced by the neutralization reaction between the resin and sodium hydroxide).

Subsequently, dispersion treatment was carried out on the vessel contents using zirconia beads (particle diameter 0.5 mm) as a medium and a bead mill ("NANO GRAIN MILL", product of Asada Iron Works Co., Ltd.). Conditions for the dispersion using the bead mill included a temperature of 10° C., a peripheral speed of 8 m/sec, and a discharge amount of 300 g/min. Through the above, a pigment dispersion III before ultrafiltration was obtained.

(Ultrafiltration Treatment)

The pigment dispersion III was filtered by a vibration ultrafiltration method. In detail, using an ultrafiltration membrane ("AHP-0013D", product of Asahi Kasei Corp., pencil type module, material of hollow fiber membrane: polyacrylonitrile, membrane inner diameter: 0.8 mm, effective membrane area: 170 cm 2), 480 g of the pigment dispersion III was circulated at a flow rate of 390 g/min for 2.0 hours under a condition of an inner pressure applied to the ultrafiltration membrane of 50 kPa. That is, the circulation time was 2.0 hours. Through the ultrafiltration, a liquid containing at least a portion of the phosphorous-containing catalyst was filtered out as a filtrate and the rest liquid containing the other pigment dispersion components was re-circulated as a recovery liquid. The solid concentration of the pigment dispersion was kept constant by adding water in an amount equal to the amount of the filtered-out filtrate to the recovery liquid. In the manner described above, a pigment dispersion IV after the ultrafiltration was obtained.

(Ink Preparation)

The ink (A-1) was prepared to have a mixing ratio i-a shown in Table 2.

TABLE 2

| Ink | Mixing ratio i-a [part by mass] |
|---|---|
| Pigment dispersion | 40.0 |
| Surfynol 420 | 0.3 |
| Triethylene glycol monobutyl ether | 20.0 |
| Glycerin | 5.0 |
| Water | Rest |
| Total | 100.0 |

The terms in Table 2 and Table 12 described later mean as follows. "Surfynol 420" means a nonionic surfactant (SURFYNOL (registered Japanese trademark) 420", product of Nissin Chemical Industry Co., Ltd., contents: ethylene oxide adduct of acetylene glycol, active component concentration: 100% by mass, HLB value: 4).

First, water was added into a flask equipped with a stirrer ("THREE-ONE MOTOR (registered Japanese trademark) BL-600", product of Shinto Scientific Co., Ltd.). The pigment dispersion IV obtained through the "ultrafiltration" described above, the nonionic surfactant (SURFYNOL (registered Japanese trademark) 420", product of Nissin Chemical Industry Co., Ltd.), triethylene glycol monobutyl ether, and glycerin were added to the flask while the flask contents were stirred at a stirring speed of 400 rpm using the stirrer, thereby obtaining a mixed liquid V. The amount of each raw material added was as shown in Table 2. Note that "Rest" being an amount of water added in Table 2 means the amount by which the mixed liquid V becomes 100.0 parts by mass. The mixed liquid V was filtered using a filter with a pore size of 5 μm to remove foreign matter and coarse particles from the mixed liquid V. Through the above, the ink (A-1) was obtained.

<Preparation of Inks (A-2) to (A-7)>

The inks (A-2) to (A-6) were prepared according to the same method as that for preparing the ink (A-1) in all aspects other than that the circulation time in the ultrafiltration was changed to those shown below in Table 3. The ink (A-7) was prepared according to the same method as that for preparing the ink (A-1) in all aspects other than that the ultrafiltration was not performed. Note that the specific phosphorus concentration was changed by changing the ultrafiltration circulation time.

<Specific Phosphorus Concentration Measurement>

According to the following method, a measurement target (each of the inks (A-1) to (A-7)) was centrifugated. Thereafter, the specific phosphorus concentration of each resultant supernatant was measured. The specific phosphorus concentrations are shown below in Table 3.

First, in an environment at 23° C., 2 g of the measurement target sealed in a vessel was centrifuged at a rotational speed of 140,000 rpm (corresponding to a centrifugal force of 1,050,000 G) for 3 hours using an ultra centrifuge ("HIMAC (registered Japanese trademark) CS150FNX", product of Eppendorf Himac Technologies Co., Ltd., rotor: S140AT). The centrifugation caused precipitation of pigment particles contained in the measurement target.

Using a syringe, 1 mL of the supernatant contained in the measurement target after the centrifugation was collected. The collected supernatant was diluted 10 times with water and the resultant dilution was taken to be a measurement sample. The measurement sample was measured using an inductively coupled plasma) (ICP) (mass spectrometer ("iCAP PRO ICP-OES Duo", product of Thermo Fisher Scientific K.K.). The phosphorus concentration (unit: ppm) in the supernatant was determined based on the resultant value (phosphorus concentration of the measurement sample). The phosphorus concentration in the supernatant was taken to be a specific phosphorus concentration (unit: ppm). Note that a calibration curve, which is plotted using a sample with a known phosphorus concentration, was used in determining the phosphorus concentration.

<Evaluation of Skewed Ejection>

With respect to each of the inks (A-1) to (A-7), occurrence or non-occurrence of skewed ink ejection from a recording head was evaluated according to the following method. Evaluation results are shown below in Table 3.

The evaluation of skewed ink ejection from the recording heads was performed in an environment of a temperature of 25° C. and a relative humidity of 60%. As an evaluation apparatus used for evaluation, an inkjet recording apparatus (prototype of KYOCERA Document Solutions Japan Inc.) was used. The evaluation apparatus included piezoelectric line heads with nozzles (radius of orifices: 10 μm) as recording heads. An evaluation target (any of the inks (A-1) to (A-7)) was loaded in a recording head for magenta ink of the evaluation apparatus. The temperature of each recording head was set at 40° C. The ink ejection amount per pixel was set to 3.5 pL.

Using the evaluation apparatus, an image (20.5 mm×29.0 mm) for which image processing by ink ejection from all the nozzles of the recording heads has been set was consecutively printed on sheets of paper ("C2", product of FUJIFILM Business Innovation Co., Ltd., plain paper) for 1 hour. The image (initial image) printed first in the consecutive printing and the image (printing-resistance image) printed last in the consecutive printing were visually observed. The presence or absence of white lines in the initial image and the printing-resistance image was checked. The white lines are image defects resulting from skewed ink ejection from a recording head. Skewed ink ejection from the recording head was evaluated according to the following criteria.

(Criteria of Skewed Ejection)

Good (A): The printing-resistance image included fewer white lines than the initial image.

Poor (B): The printing-resistance image included more white lines than the initial image.

TABLE 3

| | Ink | Circulation time [h] | Phosphorus concentration [ppm] | Skew |
|---|---|---|---|---|
| Example 1 | A-1 | 2.0 | 0.2 | A |
| Example 2 | A-2 | 1.2 | 0.4 | A |
| Example 3 | A-3 | 1.0 | 1.0 | A |
| Example 4 | A-4 | 0.8 | 1.2 | A |
| Example 5 | A-5 | 0.5 | 2.0 | A |
| Comparative example 1 | A-6 | 0.3 | 2.4 | B |
| Comparative example 2 | A-7 | not carried out | 6.0 | B |

The inks (A-1) to (A-7) shown in Table 3 all had a resin/pigment ratio of 0.40 (=6.0/15.0) as shown in Table 1. The acid value of the resin (R-1) contained in each of the inks (A-1) to (A-7) was 100 mgKOH/g.

The terms in Table 3 and Tables 4, 6, 8, 11, and 13 described later mean as follows. "Circulation time" means the circulation time in the above-mentioned "ultrafiltration". "Phosphorus concentration" means the specific phosphorus concentration. "Skew" means evaluation of skewed ink ejection from the recording head.

As shown in Table 3, the inks (A-6) and (A-7) each had a specific phosphorus concentration of greater than 2.0 ppm. Skewed ink ejection from the recording head occurred when either the inks (A-6) or (A-7) was used.

By contrast, the inks (A-1) to (A-5) each had a specific phosphorus concentration of no greater than 2.0 ppm. Skewed ink ejection from the recording head was inhibited when any of the inks (A-1) to (A-5) was used.

<Preservation Stability of Ink>

Of the inks (A-1) to (A-7), each of the inks (A-1) to (A-6) was evaluated as representative examples as to preservation stability by the following method. The evaluation results are shown below in Table 4.

First, the volume median diameter (initial particle diameter $D_A$) of each of the evaluation targets (inks (A-1) to (A-6)) was measured. Next, a vessel having a capacity of 50 mL was filled with 30 g of the ink and sealed. Thereafter, the vessel was placed in an incubator with an internal temperature thereof set at 60° C. and stored for 3 months. The vessel was then taken out of the incubator and left to stand until the temperature of the ink dropped to room temperature. Thereafter, the volume median diameter (post-storage particle diameter $D_B$) of the ink in the vessel was measured. A particle diameter change rate (unit: %) was calculated by the following formula based on the initial particle diameter $D_A$ and the post-storage particle diameter $D_B$.

$$\text{Particle diameter change rate [\%]}=100\times(\text{Post-storage particle diameter } D_B-\text{Initial particle diameter } D_A)/\text{Initial particle diameter } D_A$$

The volume median diameter was measured by the following method. First, the ink was diluted 100 times with water and the resultant dilution was taken to be a measurement sample. The volume median diameter of the pigment particles contained in measurement sample was measured using a dynamic light scattering type particle size distribution analyzer ("ZETASIZER (registered Japanese trademark) NANO ZS", product of Malvern Instruments Ltd.). The measured volume median diameter of the pigment particles contained in the measurement sample was taken to be a volume median diameter of the pigment particles contained in the ink.

The resultant particle diameter change rate was evaluated according to the following criteria. The ink with good preservation stability when stored in an environment at a temperature of 60° C. for 3 months, it tends to have good preservation stability when stored in an environment at a temperature of 40° C. for 12 months. Thus, the ink is determined to have sufficient preservation stability.

(Criteria of Preservation Stability)

A (good): particle diameter change rate of less than 10%

M (mediocre): particle diameter change rate of at least 10%, but is practicable rate

TABLE 4

| | Ink | Circulation time [h] | Phosphorus concentration [ppm] | Preservation statablity |
|---|---|---|---|---|
| Example 1 | A-1 | 2.0 | 0.2 | M |
| Example 2 | A-2 | 1.2 | 0.4 | A |
| Example 3 | A-3 | 1.0 | 1.0 | A |
| Example 4 | A-4 | 0.8 | 1.2 | A |
| Example 5 | A-5 | 0.5 | 2.0 | A |
| Comparative example 1 | A-6 | 0.3 | 2.4 | M |

As shown in Table 4, the ink (A-1) had a specific phosphorus concentration of less than 1.0 ppm. The ink (A-6) had a specific phosphorus concentration of greater than 2.0 ppm. The inks (A-1) and (A-6) each were rated as mediocre in evaluation of preservation stability.

By contrast, the inks (A-2) to (A-5) each had a specific phosphorus concentration of at least 1.0 ppm and no greater than 2.0 ppm. The inks (A-2) to (A-5) each had good preservation stability. As a result, skewed ink ejection from the recording head was inhibited when any of the inks (A-2) to (A-5) was used as shown in Table 3, and the preservation stability of the inks (A-2) to (A-5) was also excellent as shown in Table 4.

[Study 2: Resin/Pigment Ratio]

Next, the resin/pigment ratio was studied. Inks (B-1) to (B-5) were prepared according to the same method as that for preparing the ink (A-1) in all aspects other than the following changes. The mixing ratio d-a in "Pigment Dispersion Preparation" described above was changed to a mixing ratio d-b shown in Table 5. The amount of the resin (R-1) added shown in Table 5 was changed as shown in Table 6. The resin/pigment ratio was changed by changing the amount of the resin (R-1) added. In addition, the circulation time in "ultrafiltration" described above was changed to 0.6 hours. Note that the ink mixing ratio remained unchanged as the mixing ratio i-a.

With respect to each of the inks (B-1) to (B-5), the specific phosphorus concentration was measured and occurrence or non-occurrence of skewed ink ejection from the recording head was evaluated according to the same methods as those described above in "Study 1". Measurement results and evaluation results are shown below in Table 6.

TABLE 5

| Pigment dispersion | Ratio d-b [part by mass] |
|---|---|
| Water | Rest |
| Resin (R-1) | See Table 6 |
| Sodium hydroxide | Specific amount |
| Pigment PR-122 | 15.0 |
| Olfine E1010 | 0.5 |
| Total | 100.0 |

TABLE 6

| | Ink | Resin(R-1) [part by mass] | Resin/ pigment ratio | Phosphorus concentration [ppm] | Skew |
|---|---|---|---|---|---|
| Example 6 | B-1 | 4.5 | 0.30 | 1.8 | A |
| Example 7 | B-2 | 6.0 | 0.40 | 1.8 | A |
| Example 8 | B-3 | 6.8 | 0.45 | 1.8 | A |
| Example 9 | B-4 | 7.5 | 0.50 | 1.8 | A |
| Comparative example 3 | B-5 | 8.3 | 0.55 | 1.8 | B |

The acid value of the resin (R-1) contained in each of the inks (B-1) to (B-5) shown in Table 6 was 100 mgKOH/g.

As shown in Table 6, the resin/pigment ratio of ink (B-5) was greater than 0.50. Skewed ink ejection from the recording head occurred when the ink (B-5) was used.

By contrast, the resin/pigment ratio of each of the inks (B-1) to (B-4) was no greater than 0.50. Occurrence of skewed ink ejection from the recording head was inhibited when any of the inks (B-1) to (B-4) was used.

[Study 3: Acid Value of Resin]

Next, the acid value of resins was studied. Inks (C-1) to (C-6) were prepared according to the same method as that for preparing the ink (A-1) in all aspects other than the following changes. The mixing ratio d-a in "Pigment Dispersion Preparation" described above was changed to the mixing ratio d-c as shown in Table 7. The type of the resin shown in Table 7 was changed as shown in Table 8. Table 9 shows the types and percentage contents of repeating units included in the resins (R-1) to (R-6), and the mass average molecular weights and the acid values of the resins (R-1) to (R-6) shown in Table 8. The acid value of each of the resins was changed by changing the type of the resin. In addition, the circulation time in the "ultrafiltration" described above was changed to 0.6 hours. Note that the mixing ratio remained unchanged as the mixing ratio i-a.

With respect to each of the inks (C-1) to (C-6), the specific phosphorus concentration was measured and occurrence or non-occurrence of skewed ink ejection from the recording head was evaluated according to the same methods as those described above in "Study 1". Measurement results and evaluation results are shown below in Table 8.

TABLE 7

| Pigment dispersion | Mixing ratio d-c [part by mass] |
|---|---|
| Water | Rest |
| Resin (see Table 8) | 6.0 |

TABLE 7-continued

| Pigment dispersion | Mixing ratio d-c [part by mass] |
|---|---|
| Sodium hydroxide | Specific amount |
| Pigment PR-122 | 15.0 |
| Olfine E1010 | 0.5 |
| Total | 100.0 |

TABLE 8

| | Ink | Resin | Acid value [mgKOH/g] | Phosphorus concentration [ppm] | Skew |
|---|---|---|---|---|---|
| Comparative example 4 | C-1 | R-2 | 50 | 1.8 | B |
| Example 10 | C-2 | R-3 | 60 | 1.8 | A |
| Example 11 | C-3 | R-4 | 80 | 1.8 | A |
| Example 12 | C-4 | R-1 | 100 | 1.8 | A |
| Example 13 | C-5 | R-5 | 120 | 1.7 | A |
| Comparative example 5 | C-6 | R-6 | 130 | 1.8 | B |

The resin/pigment ratio of each of the inks (C-1) to (C-6) shown in Table 8 was 0.40 (=6.0/15.0) as shown in Table 7.

TABLE 9

| Resin | | | | |
|---|---|---|---|---|
| | Repeating unit | | Mass average molecular | Acid value |
| Type | Type | Ratio | weight | [mgKOH/g] |
| R-2 | MAA/MMA/BA/ST | 4.0/30.0/30.0/36.0 | 20000 | 50 |
| R-3 | MAA/MMA/BA/ST | 4.9/35.0/30.1/30.0 | 18000 | 60 |
| R-4 | MAA/MMA/BA/ST | 6.5/20.0/20.0/53.5 | 19000 | 80 |
| R-1 | MAA/MMA/BA/ST | 8.1/36.9/30.0/25.0 | 20000 | 100 |
| R-5 | MAA/MMA/BA/ST | 9.7/25.0/35.0/30.3 | 19000 | 120 |
| R-6 | MAA/MMA/BA/ST | 10.6/30.0/30.0/29.4 | 21000 | 130 |

The terms in Table 9 mean as follows. “MAA” means a repeating unit derived from methacrylic acid. “MMA” means a repeating unit derived from methyl methacrylate. “BA” means a repeating unit derived from butyl acrylate. “ST” means a repeating unit derived from styrene. “Ratio” means a ratio of the mass of each repeating unit to the mass of all repeating units included in a corresponding resin.

As shown in Table 8, the acid value of the resin contained in the ink (C-1) was less than 60 mgKOH/g. The acid value of the resin contained in the ink (C-6) was greater than 120 mgKOH/g. Skewed ink ejection from the recording head occurred when either the inks (C-1) or (C-6) was used.

By contrast, the acid value of each of the inks (C-2) to (C-5) was at least 60 mgKOH/g and no greater than 120 mgKOH/g. Occurrence of skewed ink ejection from the recording head was inhibited when any of the inks (C-2) to (C-5) was used.

[Study 4: Quinacridone Pigment]

Next, the quinacridone pigment was studied. In other words, a quinacridone pigment different from the quinacridone pigment of ink (A-1) was studied. An ink (D-1) was prepared according to the same method as that for preparing the ink (A-1) in all aspects other than the following change. The mixing ratio d-a in “Pigment Dispersion Preparation” described above was changed to a mixing ratio d-d shown in Table 10. In Table 10, “Pigment PV-19” means C.I. Pigment Violet 19. Note that the ink mixing ratio remained unchanged as the mixing ratio i-a.

With respect to the ink (D-1), the specific phosphorus concentration was measured and occurrence or non-occurrence of skewed ink ejection from the recording head was evaluated according to the same methods as those described above in “Study 1”. Measurement results and evaluation results are shown below in Table 11.

TABLE 10

| Pigment Dispersion | Mixing ratio d-d [part by mass] |
|---|---|
| Water | Rest |
| Resin (R-1) | 6.0 |
| Sodium hydroxide | Specific amount |
| Pigment PV-19 | 15.0 |
| Olfine E1010 | 0.5 |
| Total | 100.0 |

TABLE 11

| | Ink | Circulation time [h] | Phosphorus concentration ppm | Skew |
|---|---|---|---|---|
| Example 14 | D-1 | 2.0 | 0.3 | A |

The resin/pigment ratio of the ink (D-1) shown in Table 11 was 0.40 (=6.0/15.0) as shown in Table 10. The acid value of the resin (R-1) contained in the ink (D-1) was 100 mgKOH/g.

C.I. Pigment Violet 19 contained in the ink (D-1) was different from the C.I. Pigment Red 122 contained in the ink (A-1). Each of the C.I. Pigment Violet 19 and the C.I. Pigment Red 122 was a quinacridone pigment. As such, skewed ink ejection from the recording head was inhibited when the ink (D-1) was used.

[Study 5: Aqueous Medium]

Next, the aqueous medium was studied. In other words, an aqueous medium different from the aqueous medium of the ink (A-1) was studied. An ink (E-1) was prepared according to the same method as that for preparing the ink (A-1) in all aspects other than the following change. The mixing ratio i-a in “Pigment Dispersion Preparation” described above was changed to a mixing ratio i-b shown in Table 12. Note that the mixing ratio of the pigment dispersion remained unchanged as the mixing ratio d-a.

With respect to the ink (E-1), the specific phosphorus concentration was measured and occurrence or non-occurrence of skewed ink ejection from the recording head was evaluated according to the same methods as those described above in “Study 1”. Measurement results and evaluation results are shown below in Table 13.

TABLE 12

| Ink | Mixing ratio i-b [part by mass] |
|---|---|
| Pigment dispersion | 40.0 |
| Surfynol 420 | 0.3 |
| 1,5-Pentanediol | 20.0 |
| Glycerin | 5.0 |
| Water | Rest |
| Total | 100.0 |

TABLE 13

| | Ink | Circulation time [h] | Phosphorus concentration ppm | Skew |
|---|---|---|---|---|
| Example 15 | E-1 | 2.0 | 0.2 | A |

The resin/pigment ratio of the ink (E-1) shown in Table 13 was 0.40 (=6.0/15.0) as shown in Table 1. The acid value of the resin (R-1) contained in the ink (E-1) was 100 mgKOH/g.

The aqueous medium contained in ink (E-1) differed from that of ink (A-1) in containment of 1,5-pentanediol instead of triethylene glycol monobutyl ether. However, the ink (E-1) also had a resin/pigment ratio of no greater than 0.50, an acid value of resin of at least 60 mgKOH/g and no greater than 120 mgKOH/g, and a specific phosphorus concentration of no greater than 2.0 ppm likewise the ink (A-1). As such, as shown in Table 13, skewed ink ejection from the recording head was inhibited when the ink (E-1) was used.

As above, the ink of the present disclosure is thought to be able to inhibit occurrence of skewed ink ejection from the recording heads. Furthermore, the inkjet recording apparatus of the present disclosure that uses an ink as above is thought to be able to inhibit occurrence of skewed ink ejection from the recording heads.

What is claimed is:

1. An inkjet ink comprising:

a quinacridone pigment;

a resin; and an aqueous medium, wherein a ratio of a mass of the resin to a mass of the quinacridone pigment is no greater than 0.50, the resin has an acid value of at least 60 mgKOH/g and no greater than 120 mgKOH/g, a supernatant has a phosphorus concentration of no greater than 2.0 ppm, the supernatant being obtained by centrifugation of the inkjet ink at 1,050,000 G for 3 hours, and the resin includes at least one repeating unit derived from (meth)acrylic acid, at least one repeating unit derived from alkyl (meth)acrylate, and a repeating unit derived from styrene selected from styrene, a-methylstyrene, and vinyltoluene.

2. The inkjet ink according to claim 1, wherein the phosphorus concentration is at least 1.0 ppm and no greater than 2.0 ppm.

3. The inkjet ink according to claim 1, wherein the ratio of the mass of the resin to the mass of the quinacridone pigment is at least 0.35 and no greater than 0.50.

4. The inkjet ink according to claim 1, wherein the at least one repeating unit derived from (meth)acrylic acid has a percentage content to a mass of all repeating units included in the resin of at least 4.5% by mass and no greater than 10.0% by mass.

5. The inkjet ink according to claim 1, wherein the phosphorous concentration is a concentration of a phosphorous atom included in at least one selected from the group consisting of polyphosphoric acid and a derivative thereof.

6. The inkjet ink according to claim 1, wherein the resin consists of at least one repeating unit derived from (meth)acrylic acid, at least one repeating unit derived from alkyl (meth)acrylate, and a repeating unit derived from styrene selected from styrene, α-methylstyrene, and vinyltoluene.

* * * * *